United States Patent

[11] 3,578,823

[72] Inventor Frank Clymer
 Lichfield, England
[21] Appl. No. 777,754
[22] Filed Nov. 21, 1968
[45] Patented May 18, 1971
[73] Assignee Lloyds (Burton) Limited
 Burton-on-Trent, England
[32] Priority Nov. 28, 1967
[33] Great Britain
[31] 54,107/67

[54] LINKS FOR THE ENDLESS TRACKS OF TRACK-LAYING VEHICLES
2 Claims, 3 Drawing Figs.

[52] U.S. Cl. ........................................... 305/42
[51] Int. Cl. .......................................... B62d 55/20
[50] Field of Search ................................ 305/42, 41

[56] References Cited
UNITED STATES PATENTS
| | | | |
|---|---|---|---|
| 1,983,548 | 12/1934 | Knox | 305/42 |
| 2,327,909 | 8/1943 | Krotz | 305/42X |
| 2,366,450 | 1/1945 | Krotz | 305/42X |
| 2,387,387 | 10/1945 | Garber | 305/42 |

Primary Examiner—Richard J. Johnson
Attorney—Holman & Stern

ABSTRACT: A track link having at each end at least one bush which is formed of elastomeric material and which is located in a recess formed in the link, the exterior of the bush being of noncircular configuration in cross section whilst the interior of the bush is provided with a sleevelike insert which is formed of rigid material, the interior of said insert being of noncircular configuration in cross section and being adapted to receive in use a pin of corresponding cross section which will extend through the bush or bushes at the end of one link and an aligned bush or aligned bushes at the adjacent end of an adjacent link.

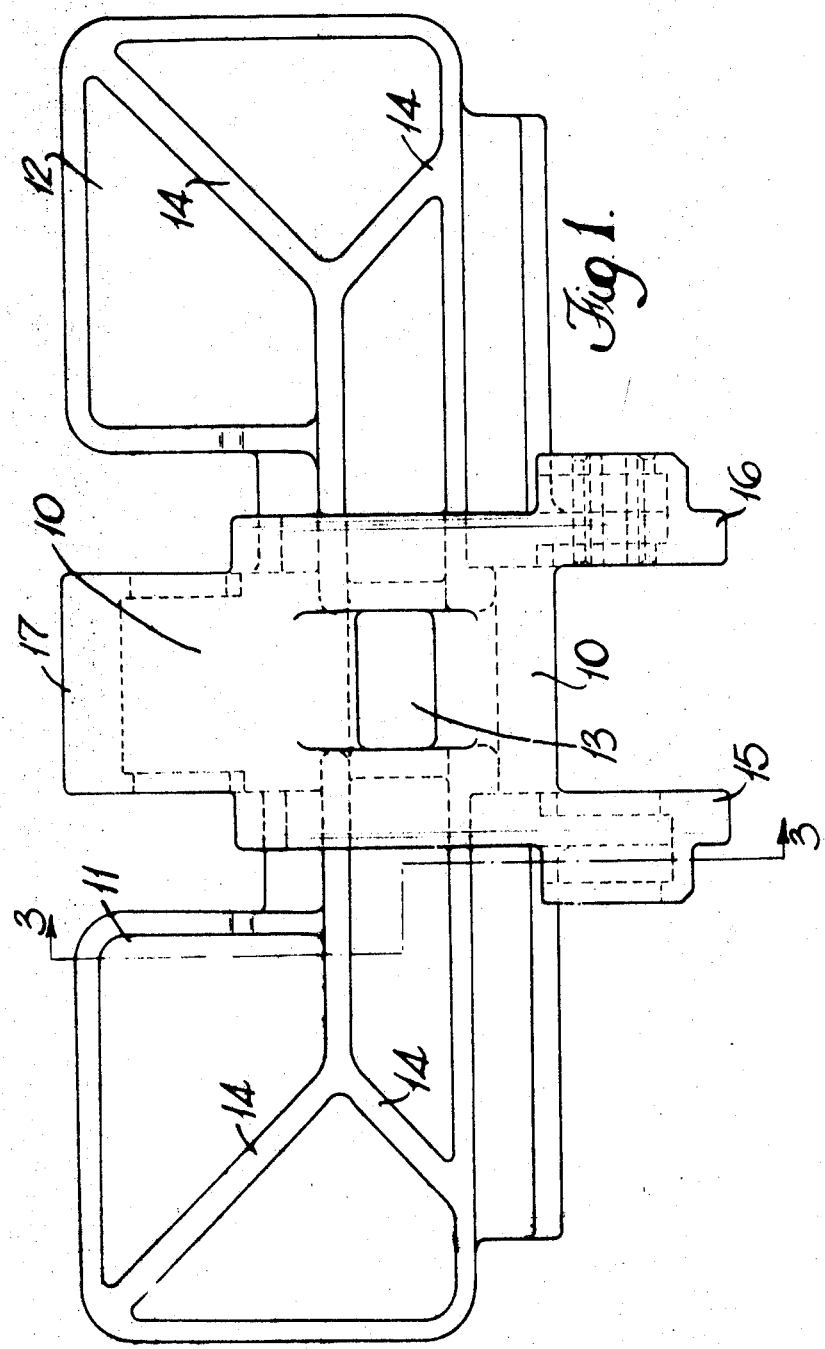

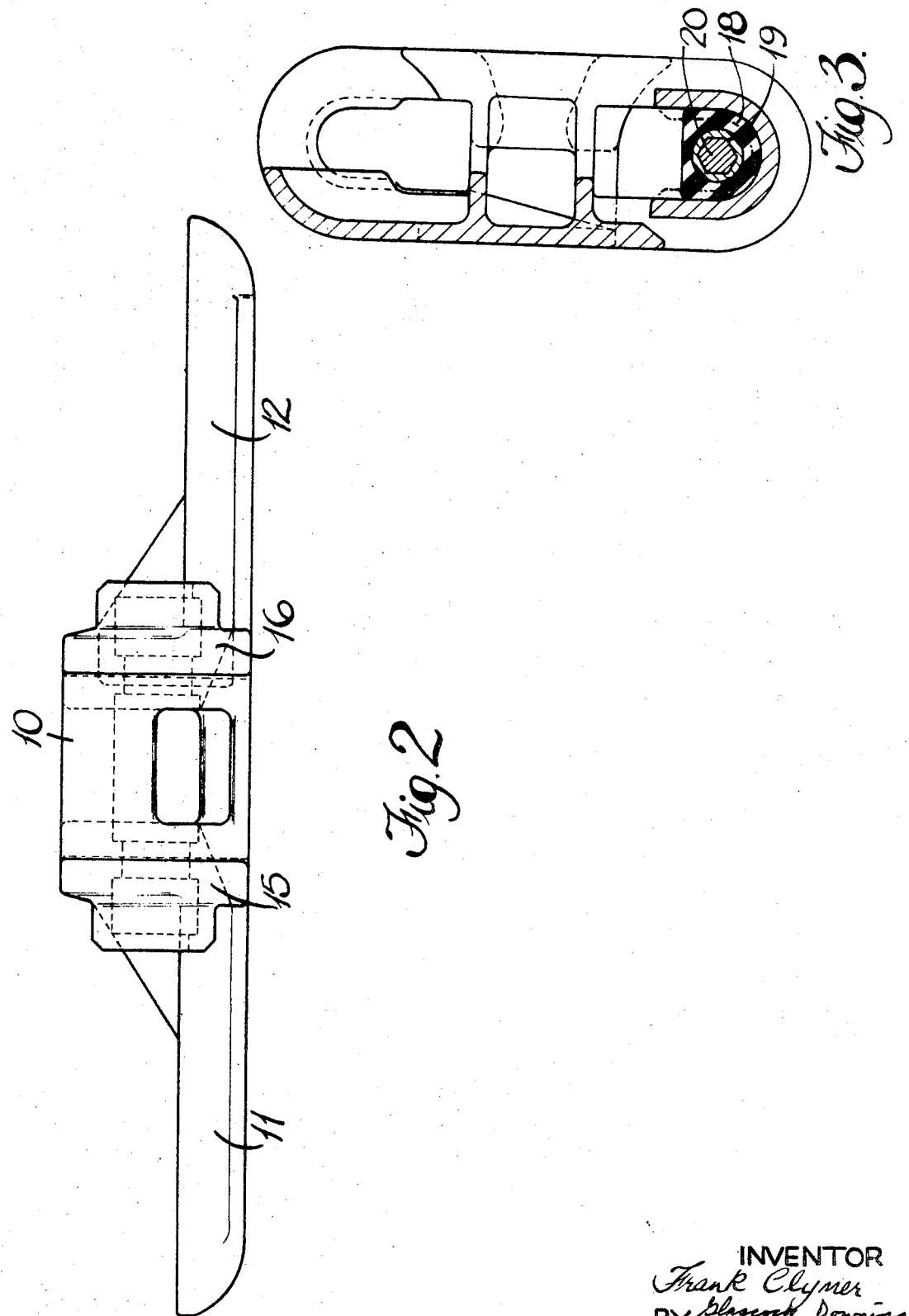

LINKS FOR THE ENDLESS TRACKS OF TRACK-LAYING VEHICLES

The object of this invention is to provide in an improved form a track link for use in the endless track of a track-laying vehicle such as an earth-moving machine or an armored fighting vehicle.

In accordance with the invention there is provided a track link which is provided at each end with means for use in connecting the link to an adjacent link, said means comprising at least one bush which is formed of elastomeric material and which is shaped so that its exterior surface is of noncircular configuration in section, said bush being located in a recess formed in the link and having a sleevelike insert which is formed of rigid material and which is shaped so that its interior surface is of noncircular configuration in section, said insert being adapted to receive a pin which in use will extend through the bush or bushes at the end of one link and an aligned bush or aligned bushes at the adjacent end of an adjacent link.

Conveniently, said bush is made of rubber whilst the insert is made of metal which is bonded to the rubber.

The invention will now be more particularly described with reference to the accompanying drawings wherein FIGS. 1 and 2 are respectively a plan view and an end view of one example of a track link constructed in accordance with the present invention, and FIG. 3 is a section taken on the line 3–3 of FIG. 1.

Referring to the drawings, the link shown therein is formed as a metal casting having a central portion 10 from which extends a pair of laterally projecting portions 11 and 12. The central portion is formed with a hole or recess 13 adapted to receive the teeth of sprocket wheels by means by which the track of which the link forms a part will in use be driven and guided. The laterally projecting portions may if desired be formed with stiffening ribs 14.

In the example now described the aforementioned central portion of the link 10 is formed at one end with a pair of spaced lugs 15 and 16 which each project in a direction which when the link is in use will be parallel to the length of the track whereas the opposite end of the link is formed with a single projecting lug 17, the arrangement being such that said two spaced lugs 15 and 16 are adapted to receive between them the single lug of the adjacent link whilst conversely the single lug 17 will project between the two spaced lugs at the adjacent end of the other adjacent link.

For use in connecting the link to its neighbors each of the aforesaid lugs 15, 16 and 17 is provided with a bush 18 (see FIG. 3) which is formed of an elastomeric material such as rubber in which is provided a sleevelike insert 19 formed of a rigid material such as steel or other suitable metal. The exterior surface of said bush 18 is formed to a noncircular configuration in section and the associated lug is formed with a recess of like shape in section so that the bush can be inserted into the recess. Conveniently, said recess in the lug is arranged (as seen in FIG. 3) so that its open end is directed towards the center of the link so that the bush 18 can be inserted into said recess from the open end thereof and then pushed towards the closed end of the recess in a direction away from the opposite end of the link. Thus in the example shown in the drawings the exterior surface of the bush and the corresponding recess are each formed to a D-shaped configuration in cross section although it is to be understood that other noncircular shapes can be used if desired.

The aforementioned sleevelike insert 19 is shaped so that its interior surface is of noncircular configuration in section but conveniently its exterior surface is of circular configuration in section so that the insert will fit into a cylindrical bore formed in the associated rubber bush 18, the insert and the bush then being bonded together. The interior surface of the insert 19 may for example be of hexagonal shape in cross section as seen in FIG. 3 and is adapted to receive a steel pin 20 which is also of hexagonal shape in exterior cross section.

In assembling two adjacent links the two spaced lugs 15 and 16 (in each of which a bush 18 and insert 19 assembly as above-described would be mounted) of one link is disposed so that the single lug 17 of the adjacent link extends between said two spaced lugs (said single lug also being provided with a bush and insert assembly as above-described) so that the steel pin 20 of hexagonal cross section can be inserted through the three aligned inserts. Furthermore in assembling the two links together the orientation of the bush and insert assembly of the single lug 17 is arranged relative to the orientation of the bush and insert assemblies of the pair of lugs 15 and 16 so that the plane of one link will be inclined to the plane of the other link at an angle which is approximately half the angle of inclination between the two links when they are passing round one of the aforesaid sprocket wheels. As assembled therefore with the two links inclined to each other as aforesaid the rubber bushes 18 will be unstressed but when the two links are passing round a sprocket wheel or when they are laid on a flat surface the bushes will be torsionally stressed, it being understood that they will not be able to turn in their respective lugs owing to the noncircular configuration of their exterior surfaces. Furthermore, the original assembly of the bushes to the recesses in the lugs or replacement of bushes in service will be a relatively simple matter since the bushes can readily be passed into or out of the recesses through the open ends thereof.

As above-described one end of the link is provided with two spaced lugs 15 and 16 whilst the other end is provided with a single lug 17 but it is, of course, to be understood that the present invention can be applied to other arrangements in which one end of the link has more than two lugs. Thus for example one end may be provided with three spaced lugs whilst the other end is provided with two spaced lugs adapted to fit between the three spaced lugs of the adjacent end of an adjacent link.

I claim:

1. A track link for the endless track of a track-laying vehicle, said link having at each end for use in pivotally connecting the link to an adjacent link in the track, a lug and a bush which is formed of elastomeric material having an opening for receiving a pivot pin and which is located in an elongated recess formed in the lug, said recess having a closed end and an open end which is directed towards the lateral center line of the link, the bush having a maximum thickness which is substantially equal to the depth of the recess as measured in a direction perpendicular to both the longitudinal and lateral center lines of the link and a maximum width as measured in a direction parallel to the longitudinal center line of the link which is greater than the depth of said recess whereby rotation of the bush in the recess is prevented, that part of the bush which is disposed adjacent to the closed end of the associated recess being of diminishing thickness towards said closed end of the recess so as to permit entry of the bush into the recess through the open end thereof by displacing the bush in a direction transverse to its axis and parallel to the longitudinal center line of the link.

2. A track link as claimed in claim 1 wherein the exterior surface of each bush and the interior surface of the associated recess are each of D-shaped configuration.